(12) United States Patent
Crespin et al.

(10) Patent No.: US 10,895,361 B1
(45) Date of Patent: Jan. 19, 2021

(54) OPTICAL DEVICE FOR AN AUTOMOBILE VEHICLE

(71) Applicant: Valeo North America, Inc., Troy, MI (US)

(72) Inventors: Charles Crespin, Seymour, IN (US); Lionel Floc'h, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/548,488

(22) Filed: Aug. 22, 2019

(51) Int. Cl.
| | |
|---|---|
| *F21S 43/239* | (2018.01) |
| *F21S 43/249* | (2018.01) |
| *F21S 43/14* | (2018.01) |
| *F21W 105/00* | (2018.01) |
| *F21W 103/55* | (2018.01) |
| *F21W 103/35* | (2018.01) |
| *F21W 103/15* | (2018.01) |
| *F21W 103/20* | (2018.01) |

(52) U.S. Cl.
CPC .............. *F21S 43/239* (2018.01); *F21S 43/14* (2018.01); *F21S 43/249* (2018.01); *F21W 2103/15* (2018.01); *F21W 2103/20* (2018.01); *F21W 2103/35* (2018.01); *F21W 2103/55* (2018.01); *F21W 2105/00* (2018.01)

(58) Field of Classification Search
CPC ...... F21S 43/235; F21S 43/241; F21S 43/239; F21S 43/242–43/249; F21S 41/24; F21S 41/20
See application file for complete search history.

(56) References Cited

U.S. PATENT DOCUMENTS

| | | | |
|---|---|---|---|
| 3,558,870 A | 1/1971 | Morrison | |
| 5,490,049 A | 2/1996 | Montalan et al. | |
| 6,095,672 A | 8/2000 | Beninga et al. | |
| 6,102,559 A * | 8/2000 | Nold | B60Q 1/0011 340/468 |
| 2003/0193815 A1* | 10/2003 | Mishimagi | B60R 1/1207 362/522 |
| 2008/0180967 A1* | 7/2008 | Totani | B60Q 1/0088 362/518 |
| 2009/0154186 A1* | 6/2009 | Natsume | B60Q 1/0041 362/516 |
| 2010/0046242 A1* | 2/2010 | Lambert | B60Q 1/0041 362/509 |
| 2014/0146554 A1* | 5/2014 | Giraud | F21S 43/14 362/511 |

* cited by examiner

*Primary Examiner* — Mariceli Santiago
(74) *Attorney, Agent, or Firm* — Valeo North America, Inc.

(57) ABSTRACT

The present invention related to an optical device comprising: a light guide; at least one first light source and at least one second light source; at least one first optical coupler and at least one second optical coupler; and at least one collimator to generate a first collimated light beam and a second collimated light beam. The at least one first optical coupler is configured to receive the first collimated light beam and directs the first collimated light beam along a first optical axis towards a first region of the light exit face to perform a first photometric function. The at least one second optical coupler is configured to receive the second collimated light beam and directs the second collimated light beam along a second optical axis towards a second region of the light exit face to perform a second photometric function.

16 Claims, 5 Drawing Sheets

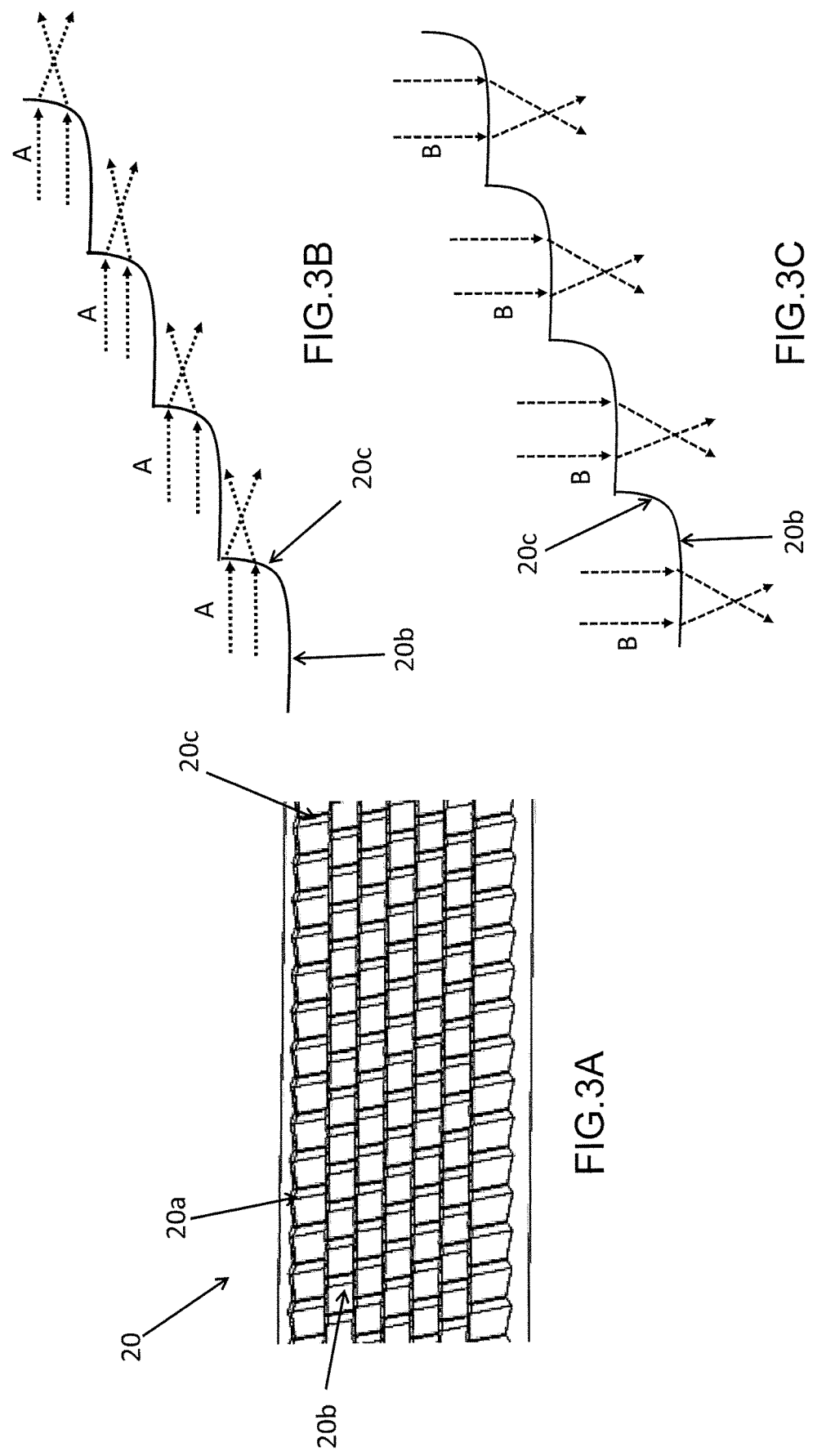

OPTICAL DEVICE FOR AN AUTOMOBILE VEHICLE

FIELD OF THE INVENTION

The present invention relates to lighting and/or signaling device for automobiles, and more particularly, to a light guide unit of the lighting and/or signaling device for automobiles.

BACKGROUND

Efforts to improve the lighting efficiency and to minimize space requirements in vehicle lamps is an on-going endeavor among Original Equipment Manufacturers (OEM) and the numerous component/system suppliers. Of particular interest is the desire to provide various lighting and/or signaling functions by using a single light guide. The present invention is directed to one such innovation solution to provide an optical device that can produce at least two different photometric functions on a common illuminating surface at same time while meeting the regulation requirements.

In the field of lighting and light signaling for automotive vehicles, it is becoming increasingly common to use light sources based on light-emitting semiconductor components, for example, light-emitting diodes (LEDs). The light emitted by an LED may, in a known manner, be coupled into a light guide having an entry face, through which the light rays emitted by the LED enter the guide, and an entry face, physically located a distance away from the entry face, through which the light rays leave the light guide. Between the entry face and the exit face, the light rays are guided within the light guide, typically using reflective elements positioned inside the light guide.

Different LEDs, capable, for example, of emitting light of different color or intensity, may be used in order to carry out different lighting and signaling functions of an automotive vehicle within one and the same lighting device. These may be, for example, the functions of high beam or turn indicator lights. In general, a single light guide is used to perform a single lighting/signaling function. In some cases, a single light guide is used to perform various functions at different times. In order to perform various functions simultaneously, multiple light guides are used. However, coupling the light produced for various lighting functions into various light guides remains a space constraint in the design of lighting devices for an automotive vehicle. Thus, the motor vehicle needs to be equipped with a plurality of light guides for meeting requirements of road regulations on lighting and/or signaling functions, thereby a larger space will be occupied by the light guides.

It should be noted that various types of LEDs housed on different PCBs (printed circuit board) for performing various functions. For example, an LED producing a high-luminosity daytime running light is housed on a first PCB and an LED producing a turn indicator light or blinker is housed on a second PCB different from the first PCB. This leads to the use of multiple PCBs for performing multiple functions, and thus leads to space wastage. The invention herein overcomes one or more of the problems of the known light guiding devices.

SUMMARY OF THE INVENTION

The present invention is directed to a unique solution to one or more of the problems discussed above. It is believed that that the present invention provides a lighting and/or signaling device that can produce at least two different photometric functions on a common illuminating surface at same time while meeting the regulation requirements.

Accordingly, pursuant to a first aspect of the present invention, there is contemplated an optical device for a motor vehicle, the optical device comprising: a light guide having a light entry face and a light exit face disposed opposite to the light entry face; at least one first light source and at least one second light source positioned at the light entry face; at least one first optical coupler and at least one second optical coupler; at least one collimator associated with each of the first coupler and the second coupler to collimate light beams emitted by the at least one first light source and the at least one second light source and generates a first collimated light beam and a second collimated light beam, respectively; wherein the at least one first optical coupler is configured to receive the first collimated light beam and directs the first collimated light beam along a first optical axis towards a first region of the light exit face to perform a first photometric function; wherein the at least one second optical coupler is configured to receive the second collimated light beam and directs the second collimated light beam along a second optical axis towards a second region of the light exit face to perform a second photometric function; and wherein the first optical axis is perpendicular to the second optical axis.

The invention may be further characterized by one or any combination of the features described herein, such as: the at least one first light source and the at least one second light source are positioned on a single Printed Circuit Board (PCB); the at least one collimator, the light guide, the at least one first coupler, and the at least one second coupler are comprised of a single polymeric piece; the first photometric function is one of: turn indicator function, daytime running light (DRL) function, turn function, stop function, and tail function; the second photometric function is a side-marker light function; the first region includes complete light exit face and the complete light exit face is illuminated to perform the first photometric function; the second region includes an end portion of the light exit face and the end portion is illuminated to perform the second photometric function; the at least one first optical coupler and the at least one second optical coupler are integrated with the light entry face of the light guide; the at least one second coupler is positioned at an end of the light entry face of the light guide; the at least one second coupler is positioned adjacent to a first optical coupler located at an end of the light entry face of the light guide; the light guide comprises an upper face and a bottom face that are parallel and interconnected by the light exit face; the at least one first light source and the at least one second light source are Light Emitting Diodes (LED's); the optical module functions for providing lighting, signaling, or both for the motor vehicle; the first optical coupler and the second optical coupler are same type of couplers; and the first optical coupler and the second optical coupler are different type of couplers.

Accordingly, pursuant to a second aspect of the present invention, there is contemplated an optical device for a motor vehicle, the optical device comprising: a light guide having a light entry face and a light exit face disposed opposite to the light entry face; at least one first light source to emit a first light beam and at least one second light source to emit a second light beam; at least one first optical coupler and at least one second optical coupler, wherein the at least one first coupler and the at least one second coupler are integrated with the light entry face of the light guide; wherein the at least one first optical coupler is configured to receive the first light beam and directs the first light beam along a first optical axis to illuminate entire light exit face to perform one of: turn indicator function, daytime running light (DRL) function, parking light function, stop function, tail function, and the like; wherein the at least one second optical coupler is configured to receive the second light beam and directs the second light beam along a second optical axis to illuminate a portion of the light exit face to perform a side-marker light function; and wherein the first optical axis is perpendicular to the second optical axis.

Accordingly, pursuant to a second aspect of the present invention, there is contemplated a lighting and/or signaling device for a motor vehicle, the lighting and/or signaling device comprising: a reflector assembly; a lens; a housing; and an optical device, wherein the optical device comprises: a light guide having a light entry face and a light exit face disposed opposite to the light entry face; at least one first light source to emit a first light beam and at least one second light source to emit a second light beam; at least one first optical coupler and at least one second optical coupler, wherein the at least one first coupler and the at least one second coupler are integrated with the light entry face of the light guide; wherein the at least one first optical coupler is configured to receive the first light beam and directs the first light beam along a first optical axis to illuminate entire light exit face to perform one of: turn indicator function, daytime running light (DRL) function, parking light function, turn function, stop function, tail function, and the like; wherein the at least one second optical coupler is configured to receive the second light beam and directs the second light beam along a second optical axis to illuminate a portion of the light exit face to perform a side-marker light function; and wherein the first optical axis is perpendicular to the second optical axis.

It should be appreciated that the above referenced aspects and examples are non-limiting, as others exist within the present invention, as shown and described herein.

DESCRIPTION OF DRAWINGS

FIG. 3A shows an exploded view of a portion of a light exit face of the optical device shown in the FIG. 1 and the FIG. 2, according to the present invention.

FIG. 3B illustrates a path of light rays along a first optical axis at the light exit face for performing a first photometric function, according to the present invention.

FIG. 3C illustrates a path of light rays along a second optical axis at the light exit face for performing a second photometric function, according to the present invention.

DETAILED DESCRIPTION OF THE PREFERRED EMBODIMENTS

The present invention relates to a lighting and/or signaling device that can produce efficient and uniform light beam. In particular, the present invention provides a lighting and/or signaling device that can produce at least two different photometric functions on a common illuminating surface at same time while meeting the regulation requirements.

The term "optical axis" is used herein to refer to an imaginary line or plane that defines a path along or proximate which light propagates.

Unless defined otherwise, all technical and scientific terms used herein have the same meaning as commonly understood by one of ordinary skill in the art to which this technology belongs.

Figure 1:
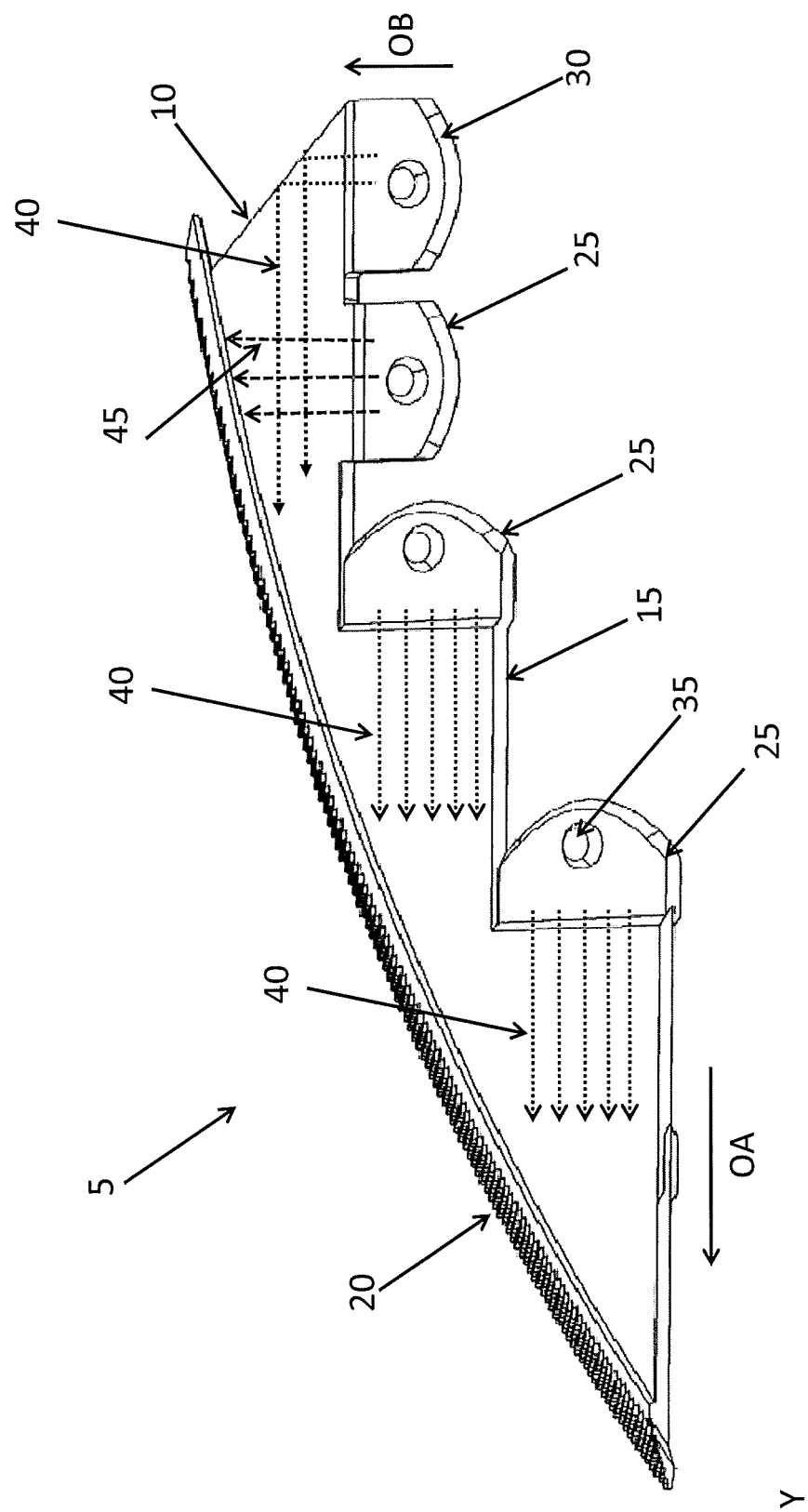
FIG. 1 shows a perspective view of an optical device for a motor vehicle, according to the present invention.
Figure 2:
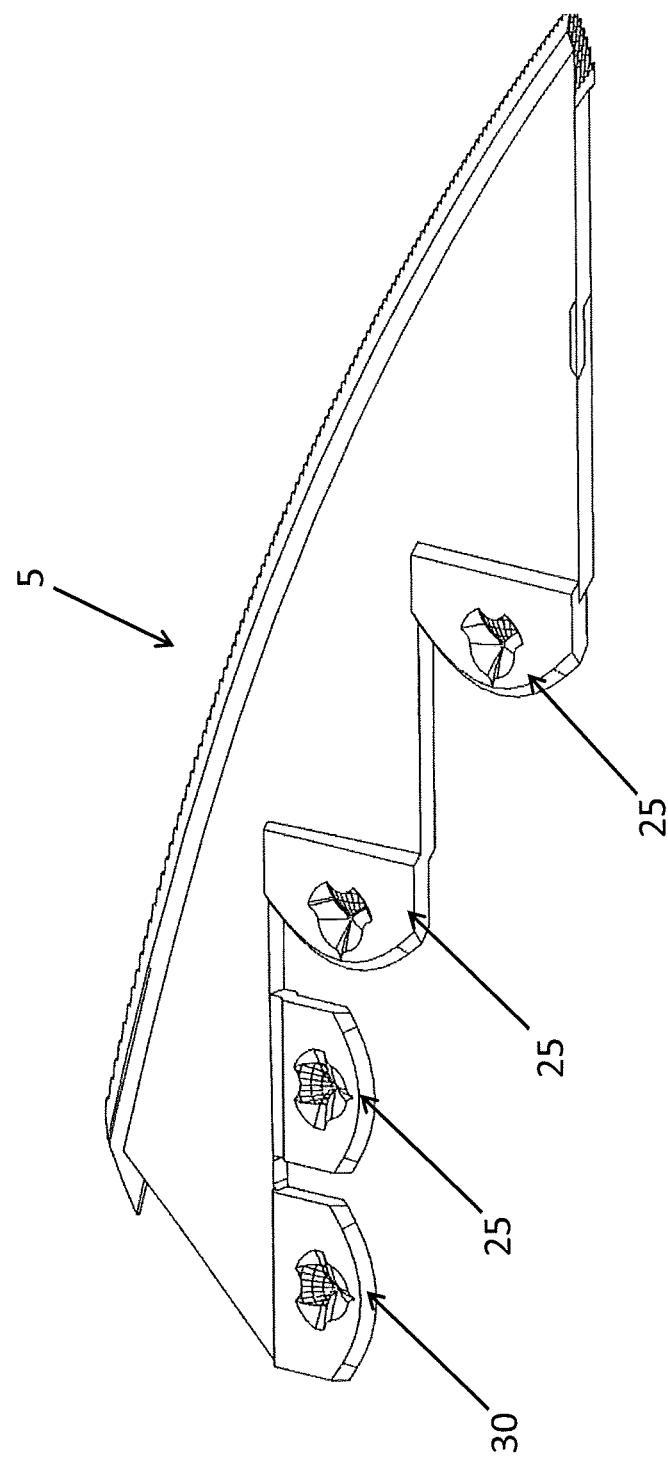
FIG. 2 shows a backside view of the optical device shown in the FIG. 1, according to the present invention.
Figure 4A:
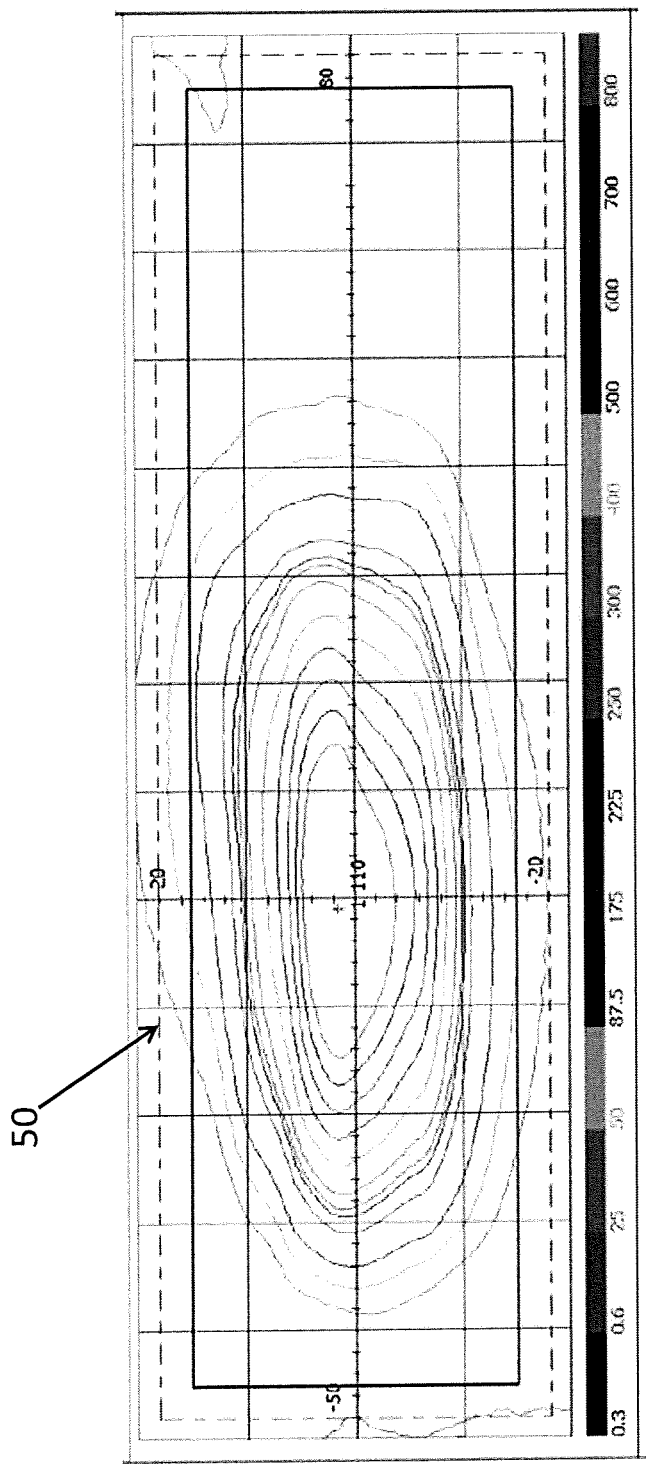
FIG. 4A shows a beam pattern of the optical device obtained while performing a first photometric function, according to the present invention.
Figure 4B:
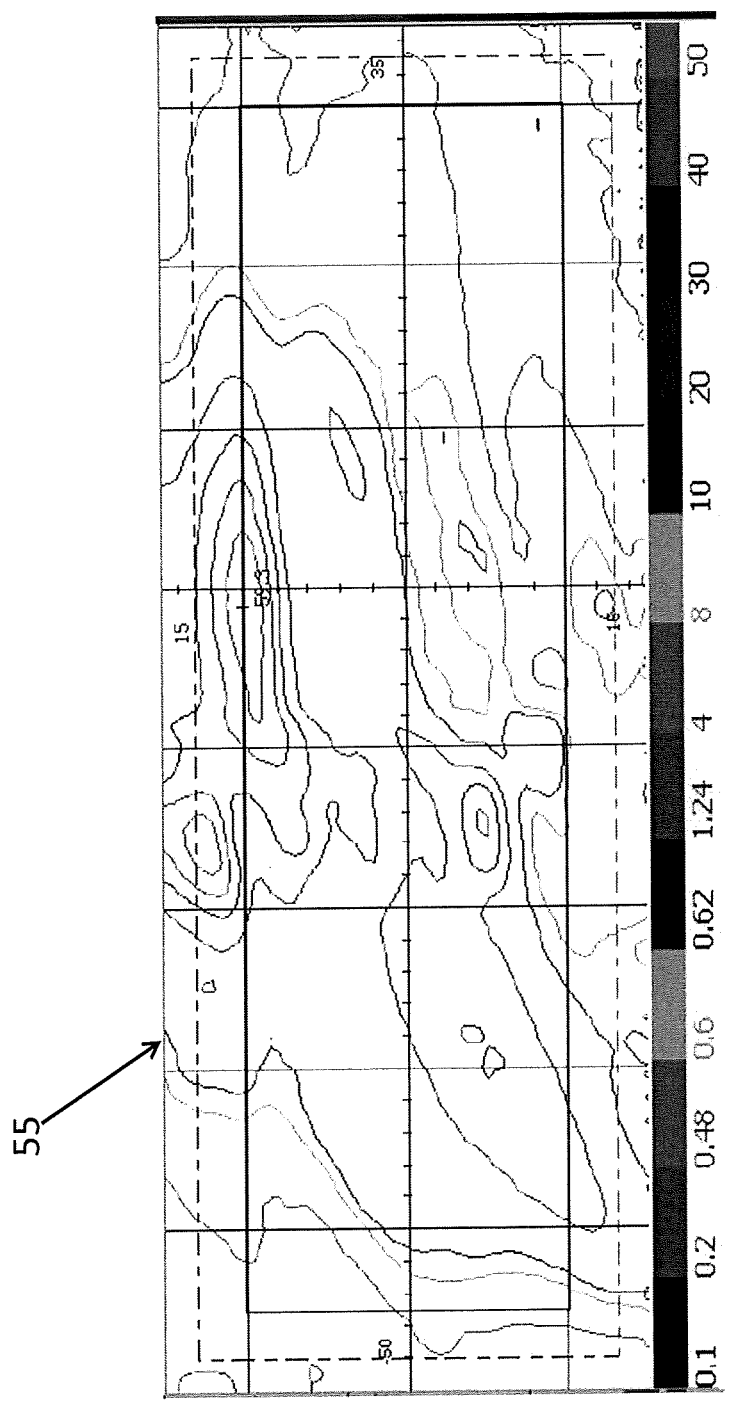
FIG. 4B shows a beam pattern of the optical device obtained while performing a second photometric function, according to the present invention.

FIG. 1 shows a perspective view of an optical device for a motor vehicle, according to the present invention. FIG. 2 shows a backside view of the optical device shown in the FIG. 1, according to the present invention. FIG. 3A shows an exploded view of a portion of a light exit face of the optical device shown in the FIG. 1 and the FIG. 2, according to the present invention. FIG. 3B illustrates a path of light rays emitted along a first optical axis at the light exit face for performing a first photometric function, according to the present invention. FIG. 3C illustrates a path of light rays along a second optical axis at the light exit face for performing a second photometric function, according to the present invention. FIG. 4A shows a beam pattern of the optical device obtained while performing a first photometric function, according to the present invention. FIG. 4B shows a beam pattern of the optical device obtained while performing a second photometric function, according to the present invention.

FIG. 1A to FIG. 4B illustrates an embodiment of a lighting and/or signaling device for vehicles, in particular to automobiles, according to the present invention. It is understood that the invention is also applicable to lighting devices or even to lighting and signaling devices for such vehicles.

For the following description, it will be appreciated that optical module 5 surfaces define an XYZ orthogonal coordinate system with X, Y and Z corresponds to height axis of the optical device according to Z, with the length axis of said optical device according to X-axis and width of the optical device according to Y.

As shown in the FIG. 1, an optical device 5 for a motor vehicle comprising: a light guide 10 having a light entry face 15 and a light exit face 20 disposed opposite to the light entry face 15; at least one first light source and at least one second light source (not shown in the Figures) positioned at the light entry face 15; at least one first optical coupler 25 and at least one second optical coupler 30; and at least one collimator 35. In an embodiment, the at least one first light source and the at least one second light source are disposed at a predetermined point with respect to the light guide 10.

In an embodiment, the at least one first optical coupler 25 and the at least one second optical coupler 30 are integrated with the light entry face 15 of the light guide 10.

A collimator 35 is associated with each of the first coupler 25 and the second coupler 30 to collimate light beams emitted by the at least one first light source and the at least one second light source and generates a first collimated light beam 40 and a second collimated light beam 45, respectively. In an embodiment, the at least one first light source and the at least one second light source are positioned on a single Printed Circuit Board (PCB).

In an embodiment, the at least one first light source is configured for emitting light with a first color and the at least one second light source configured for emitting light with a second color. For example, the first light source is a white light LED for performing a daytime running light function and the second light source is amber light LED for performing a side marker light function. In an embodiment, the at least one first light source and the at least one second light source are capable of emitting lights having two different brightnesses.

According to an embodiment of the present invention, the light guide 10 is preferably made of a transparent plastic, by means of injection molding. The light guide 10 may be curved, following the curved geometry of headlight of vehicles. In other embodiments, the light guide 10 may be differently curved. However, the present invention is not limited to the curved light guides, but also extends to rectilinear light guides. The light entry face 15 and the light exit face 20 are substantially parallel to one another, so that the light guide 10 has a constant thickness. The light guide 10 is configured such that the recieved light is guided from the light entry face 15 to the light exit face 20 along an optical axis OA, in other words along the X axis.

In an embodiment, the at least one second coupler 30 is positioned at an end of the light entry face 15 of the light guide 10. In another embodiment, the at least one second coupler 30 is positioned adjacent to a first optical coupler 25 located at an end of the light entry face 15 of the light guide 10. Therefore, the light beams emitted from the first light sources and the second light source(s) enter the light guide at different positions of the light entry face.

For the sake of explanation, a single second coupler 30 is positioned at an end of the light entry face 15 of the light guide 10, as shown in the FIG. 1. It will be understood that the number of second optical couplers 30 are not limited to one and notably depends on amount of surface area to be illuminated to perform a photometric function.

In an embodiment, the first optical couplers 25 and the second optical couplers 30 are of same type of optical couplers. In another embodiment, the first optical couplers 25 and the second optical couplers 30 are of different type of optical couplers that are known to a person skilled in the art.

The first optical coupler 25 is configured to receive the first collimated light beam 40 and directs the first collimated light beam 40 along a first optical axis, i.e, the optical axis OA, toward a first region of the light exit face to perform a first photometric function. In an embodiment, the first region corresponds to complete surface of the light exit face 20. The first photometric function is one of: turn indicator function, daytime running light (DRL) function, parking light function, stop function, tail function, and the like.

The second optical coupler 30 is configured to receive the second collimated light beam 45 and directs the second collimated light beam 45 along a second optical axis, i.e., the optical axis B, toward a second region of the light exit face 20 to perform a second photometric function. The second region corresponds to a portion of the light exit face that is required to be illuminated to perform the second photometric function. The second photometric function is a side-marker light function.

In an embodiment, the first optical axis OA is perpendicular to the second optical axis OB. In other words, the first optical axis is along X-axis and the second optical axis is along Y-axis, as shown in the FIG. 1.

In an embodiment, the first optical couplers 25, the second optical coupler(s) 30, and the associated light sources are arranged in such a way that an observer when viewed from a front of the motor vehicle can view the first photometric function. Further, an observer from a side of the motor vehicle can view the second photometric function. Thus, two different photometric functions are produced on a common illuminating surface 20 at same time. Accordingly, in the vehicular lamp of the present invention, the lamp structure is simplified to achieve the reduction in size and cost.

FIG. 3A shows an exploded view of a portion of the light exit face 20 of the optical device shown in the FIG. 1 and the FIG. 2, according to the present invention. As can be seen from the FIG. 3A, the light exit face 20 is formed by a plurality of light scattering elements 20a for distribution of received light rays in the direction required by international regulations. Each light scattering element 20a includes a first face 20b and a second face 20c. The light scattering elements 20a are positioned in such a way that the first faces 20b receive the light rays directed along the first optical axis OA and the second faces 20c receive the light rays directed along the second optical axis OB.

The first faces 20b are configured to receive the light rays emitted by the first light sources and distribute the received light rays to illuminate homogeneously the entire surface of the light exit face 20, thus performing the first photometric function. FIG. 3B illustrates the light rays directed on the first faces 20b of the light scattering elements 20a to perform the first photometric function, and it is visible to an observer viewing from a front of the vehicle. As previously mentioned, the first photometric function is one of: turn indicator function, daytime running light (DRL) function, stop function, parking light function, and tail function. FIG. 4A shows a beam pattern 50 of the optical device obtained while performing the first photometric function, according to the present invention.

The second faces 20c are configured to receive the light rays emitted by the second light source(s) and distribute the received light rays to illuminate the second region of the light exit face 20, thus performing the second photometric function. FIG. 3B illustrates the light rays directed on the second faces 20c of the light scattering elements 20a to perform the second photometric function. As previously mentioned, the second photometric function is a side-marker light function and it is visible to an observer viewing from a side of the vehicle. FIG. 4B shows a beam pattern 55 of the optical device obtained while performing a second photometric function, according to the present invention.

In another embodiment, the present invention relates to a lighting and/or signaling device for a motor vehicle comprising: a reflector assembly; a lens; a housing; and an optical device 5 as discussed in previous embodiments.

In an embodiment, the optical device 5 is monolithic, in other words, formed from a single piece, for example by molding of plastic material, i.e., the light guide, at least one collimator 35 and the at least one first optical coupler 25 and the at least one second optical coupler 30 are comprised of a single polymeric piece.

Although the present disclosure is provided with reference to figures, all of the embodiments shown in figures are intended to explain the preferred embodiments of the present invention by ways of examples, instead of being intended to limit the present invention.

Apparently, it would be appreciated by those skilled in the art that various changes or modifications may be made in the present disclosure without departing from the principles and spirit of the disclosure, which are intended to be covered by the present invention as long as these changes or modifications fall within the scope defined in the claims and their equivalents.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially" of to describe a combination shall include the elements, ingredients, components or steps identified, and such other elements ingredients, components or steps that do not materially affect the basic and novel characteristics of the combination.

The invention claimed is:

1. An optical device for a motor vehicle comprising:
   a light guide having a light entry face and a light exit face disposed opposite to the light entry face;
   at least one first light source and at least one second light source positioned at the light entry face;
   at least one first optical coupler and at least one second optical coupler;
   at least one collimator associated with each of the first coupler and the second coupler to collimate light beams emitted by the at least one first light source and the at least one second light source and generates a first collimated light beam and a second collimated light beam, respectively;
   wherein the at least one first optical coupler is configured to receive the first collimated light beam and directs the first collimated light beam along a first optical axis towards a first region of the light exit face to perform a first photometric function;
   wherein the at least one second optical coupler is configured to receive the second collimated light beam and directs the second collimated light beam along a second optical axis towards a second region of the light exit face to perform a second photometric function;
   wherein the first optical axis is perpendicular to the second optical axis; and
   wherein the at least one collimator, the light guide, the at least one first coupler, and the at least one second coupler are comprised of a single polymeric piece.

2. The optical device as claimed in claim 1, wherein the at least one first light source and the at least one second light source are positioned on a single Printed Circuit Board (PCB).

3. The optical device as claimed in claim 1, wherein the first photometric function is one of: turn indicator function, daytime running light (DRL) function, stop function, tail function or some combination of the turn indicator, the DRL, the stop or the tail function.

4. The optical device as claimed in claim 1, wherein the second photometric function is a side-marker light function.

5. The optical device as claimed in claim 1, wherein the first region includes complete light exit face and the complete light exit face is illuminated to perform the first photometric function.

6. The optical device as claimed in claim 1, wherein the second region includes an end portion of the light exit face and the end portion is illuminated to perform the second photometric function.

7. The optical device as claimed in claim 1, wherein the at least one first optical coupler and the at least one second optical coupler are integrated with the light entry face of the light guide.

8. The optical device as claimed in claim 7, wherein the at least one second coupler is positioned at an end of the light entry face of the light guide.

9. The optical device as claimed in claim 7, wherein the at least one second coupler is positioned adjacent to a first optical coupler located at an end of the light entry face of the light guide.

10. The optical device as claimed in claim 1, wherein the light guide comprises an upper face and a bottom face that are parallel and interconnected by the light exit face.

11. The optical device as claimed in claim 1, wherein the at least one first light source and the at least one second light source are Light Emitting Diodes (LED's).

12. The optical module of claim 1, wherein the optical module functions for providing lighting, signaling, or both for the motor vehicle.

13. The optical module of claim 1, wherein the first optical coupler and the second optical coupler are same type of couplers.

14. The optical module of claim 1, wherein the first optical coupler and the second optical coupler are different type of couplers.

15. An optical device for a motor vehicle comprising:
    a light guide having a light entry face and a light exit face disposed opposite to the light entry face;
    at least one first light source to emit a first light beam and at least one second light source to emit a second light beam;
    at least one collimator;
    at least one first optical coupler and at least one second optical coupler, wherein the at least one first coupler and the at least one second coupler are integrated with the light entry face of the light guide;
    wherein the at least one first optical coupler is configured to receive the first light beam and directs the first light beam along a first optical axis to illuminate entire light exit face to perform one of: turn indicator function, daytime running light (DRL) function, turn function, stop function, and tail function;
    wherein the at least one second optical coupler is configured to receive the second light beam and directs the second light beam along a second optical axis to illuminate a portion of the light exit face to perform a side-marker light function;
    wherein the first optical axis is perpendicular to the second optical axis; and
    wherein the at least one collimator, the light guide, the at least one first coupler, and the at least one second coupler are comprised of a single polymeric piece.

16. A lighting or signaling device for a motor vehicle comprising:
    a reflector assembly;
    a lens;
    a housing; and
    an optical device, wherein the optical device comprises:

at least one collimator;

a light guide having a light entry face and a light exit face disposed opposite to the light entry face;

at least one first light source to emit a first light beam and at least one second light source to emit a second light beam;

at least one first optical coupler and at least one second optical coupler, wherein the at least one first coupler and the at least one second coupler are integrated with the light entry face of the light guide;

wherein the at least one first optical coupler is configured to receive the first light beam and directs the first light beam along a first optical axis to illuminate entire light exit face to perform one of: turn indicator function, daytime running light (DRL) function, turn function, stop function, tail function or some functional combination thereof;

wherein the at least one second optical coupler is configured to receive the second light beam and directs the second light beam along a second optical axis to illuminate a portion of the light exit face to perform a side-marker light function;

wherein the first optical axis is perpendicular to the second optical axis; and wherein the at least one collimator, the light guide, the at least one first coupler, and the at least one second coupler are comprised of a single polymeric piece.

* * * * *

UNITED STATES PATENT AND TRADEMARK OFFICE
CERTIFICATE OF CORRECTION

Page 1 of 1

PATENT NO. : 10,895,361 B1
APPLICATION NO. : 16/548488
DATED : January 19, 2021
INVENTOR(S) : Charles Crespin and Lionel Floc'h It is certified that error appears in the above-identified patent and that said Letters Patent is hereby corrected as shown below:

In the Claims

Column 8, please amend Claims 12-14 as follows:

Claim 12: Replace, "The optical module of claim 1, where the optical module . . ." with --The optical device of claim 1, where the optical device . . .--

Claim 13: Replace, "The optical module of claim 1 . . ." with --The optical device of claim 1 . . .--

Claim 14: Replace, "The optical module of claim 1 . . ." with --The optical device of claim 1 . . .--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*